Patented Oct. 14, 1924.

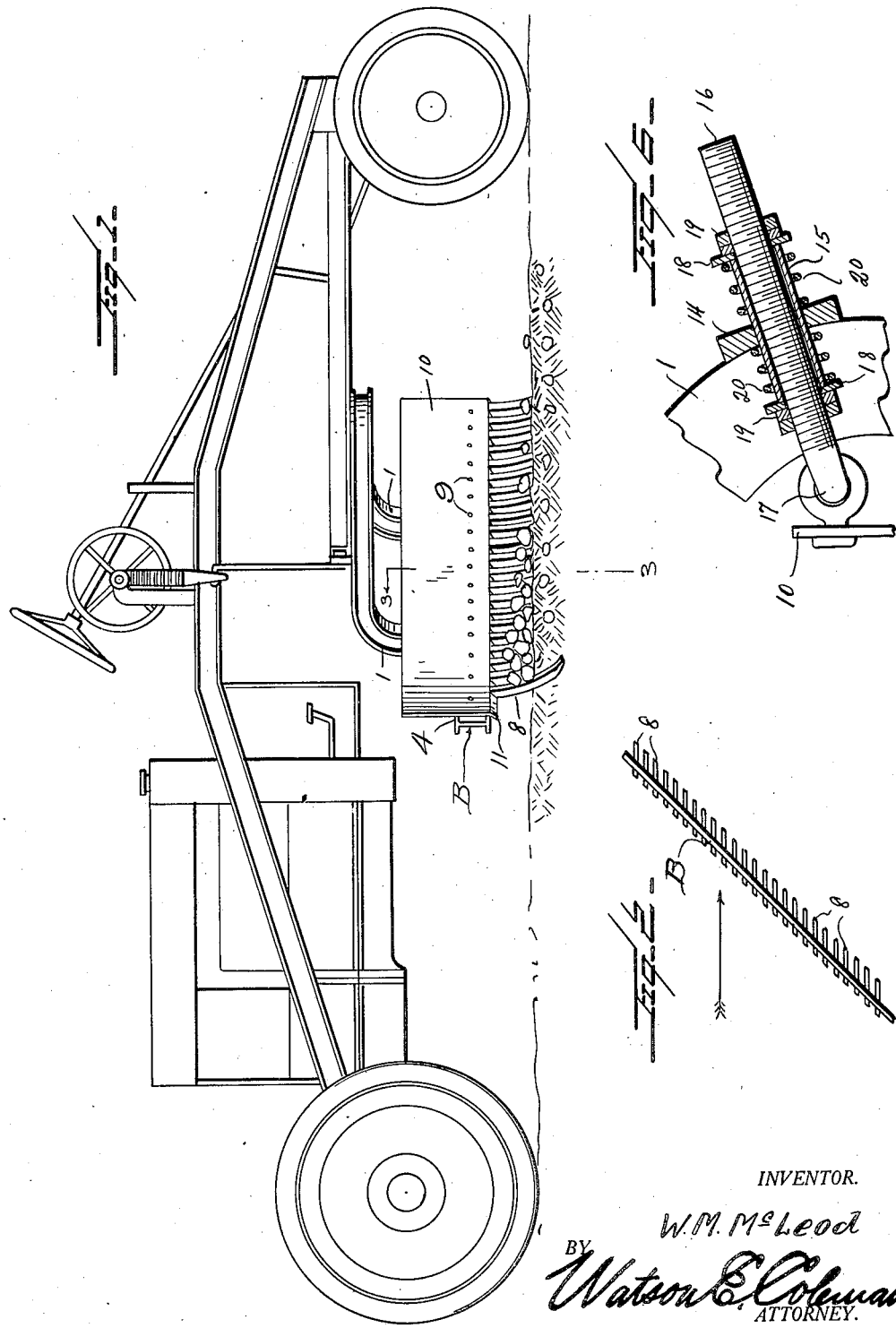

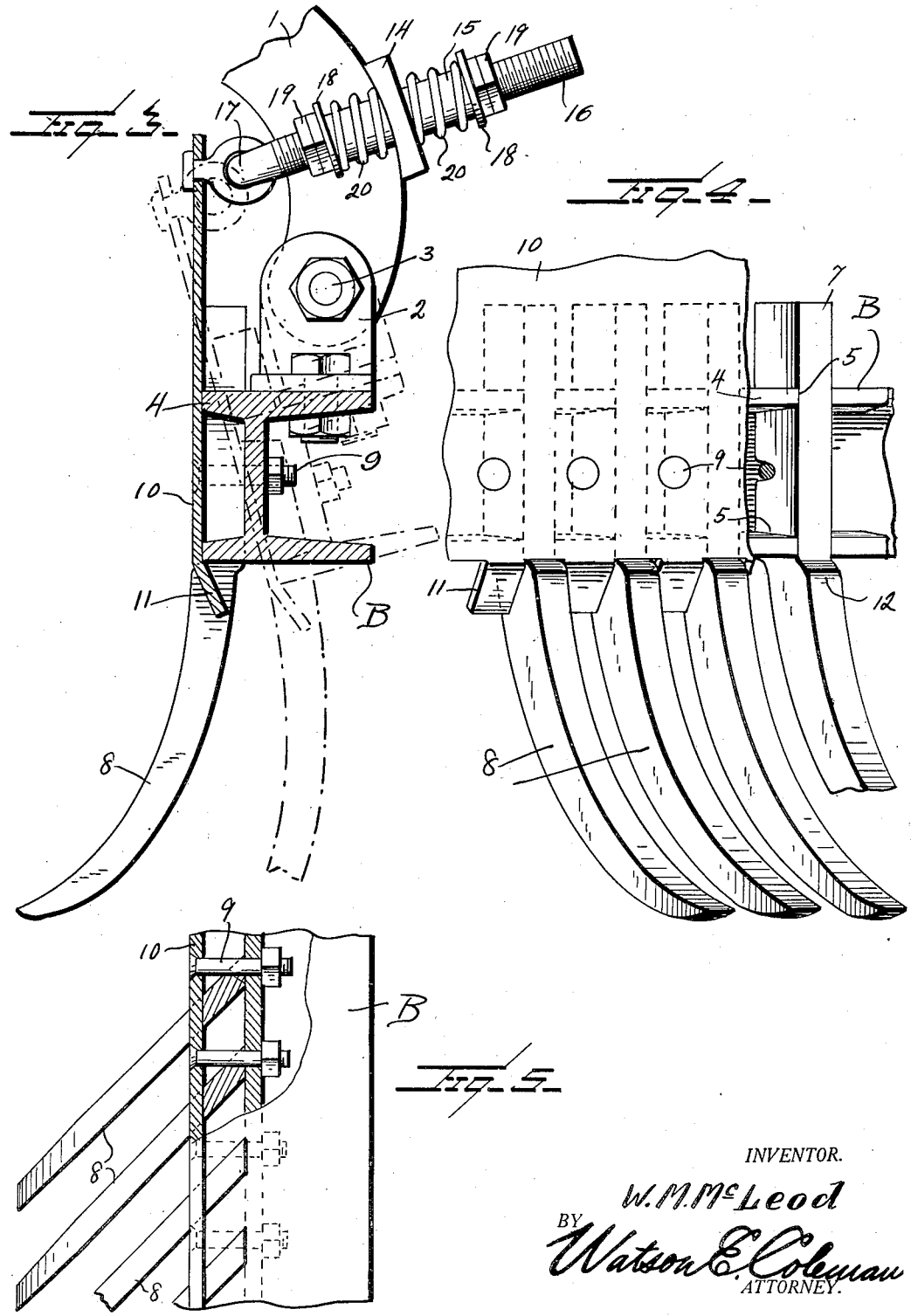

1,511,292

UNITED STATES PATENT OFFICE.

WILLIAM M. McLEOD, OF MONTE VISTA, COLORADO.

STONE RAKE.

Application filed August 21, 1923. Serial No. 658,579.

*To all whom it may concern:*

Be it known that I, WILLIAM M. MCLEOD, a citizen of the United States, residing at Monte Vista, in the county of Rio Grande and State of Colorado, have invented certain new and useful Improvements in Stone Rakes, of which the following is a specification, reference being had to the accompanying drawings.

This invention relates to certain improvements in stone rakes and it is primarily an object of the invention to provide a novel and improved device of this general character adapted to be attached to the grader arms or brackets of a scraper or scarifier of a conventional type.

It is also an object of the invention to provide a novel and improved device of this general character which is adapted to coact with a scarified or plowed ground to remove the oversize gravel or rock which has become loosened.

An additional object of the invention is to provide a novel and improved device of this general character whereby the oversize gravel or rock removed thereby is deposited along the banks of the grade where the stones will serve to prevent erosion of the bank but when the rake is employed for removing stones or the like from a plowed field the stones or the like will be deposited in windrows so that the same can be readily forked or shoveled into wagons.

Another object of the invention is to provide a novel and improved device of this general character comprising a plurality of teeth adapted to penetrate the ground to be treated and wherein the teeth have their side faces in line with the line of draft of the device to permit the undersize gravel or stone to freely pass between the teeth, the forward faces of the teeth being oblique with respect to the line of draft to facilitate the discharge of the oversize at one end of the rake.

Furthermore it is an object of the invention to provide a novel and improved device of this general character comprising a plurality of teeth disposed on a downward and forward incline to facilitate the raising of the oversize stone or the like below the surface of the ground being treated, together with a moldboard associated with the upper portions of said teeth to facilitate the deposit of the oversize stone or the like at one end of the rake.

It is also an object of the invention to provide a novel and improved device of this general character supported, when in working position, for swinging movement in a vertical direction and comprising a plurality of teeth adapted to engage the ground to be treated together with means for adjusting the device about its axis whereby the extent of penetration of the teeth may be regulated.

The invention consists in the details of construction and in the combination and arrangement of the several parts of my improved stone rake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a grader or scarifying machine of a conventional type having applied thereto a rake constructed in accordance with an embodiment of my invention;

Figure 2 is a diagrammatic view in top plan of my improved rake illustrating its preferred position with respect to the line of draft of the machine;

Figure 3 is an enlarged fragmentary view partly in section and partly in elevation of my improved rake and an associated moldboard arm or bracket, a second position of the device being indicated by broken lines;

Figure 4 is an enlarged fragmentary view in front elevation of the rake as herein disclosed;

Figure 5 is a fragmentary view partly in section and partly in top plan of my improved rake as herein set forth;

Figure 6 is an enlarged fragmentary view partly in section and partly in elevation illustrating an attaching means coacting with the moldboard comprised in the rake as herein disclosed.

As disclosed in the accompanying drawings, 1 denotes the depending moldboard arms or brackets of a type used in connection with the grader or scarifying machine of a conventional type and with which my improved rake is adapted to be employed, it being understood that my improved rake is adapted to be substituted for the ground working element of the grader or scarifier.

My improved rake as herein disclosed comprises an elongated beam B substantially H-shaped in cross section and which is provided adjacent each end portion with the lug 2 bolted or otherwise anchored to the beam B, said lug 2 being pivotally connected as at 3 with a grader arm or bracket 1 whereby the rake in its entirety, when in applied position, is supported for swinging movement in a vertical direction. The beam B when in applied position is also disposed on a predetermined angle with respect to the line of draft of the machine.

The forward flanges 4 of the beam B at points spaced longitudinally thereof are provided with the notches 5 and engaging within each pair of vertically spaced notches 5 is a shank 7 of a tooth 8, said tooth 8 being disposed on a downward and forward curvature and said tooth is also rhomboid in form in cross section with its side faces in line with the line of draft of the machine and with its outer or working face disposed on substantially the same degree of inclination as the beam B. The tooth 8 is also disposed on an inclination in a direction lengthwise of the beam B of about 45° with respect to the beam so that said tooth will be disposed substantially straight ahead when the rake is in applied or working position.

The cross sectional configuration of each of the teeth 8 permits undersize rock or the like to freely pass between adjacent teeth while the forward faces of said teeth serve to push or draw the oversize rock or the like toward one end of the rake.

Overlying the forward face of the beam B and secured thereto by the bolts 9 or the like is a moldboard 10, said moldboard having its outer face flat and unobstructed and the lower marginal portion of said moldboard 10 has extending downwardly and inwardly therefrom flanges or lugs 11, each of which is disposed between a pair of adjacent teeth 8. It is also to be noted that the shank 7 of each of the teeth 8 is inwardly offset with respect to the tooth proper whereby a shoulder 12 is provided for contact with the lower marginal portion of the moldboard 10, whereby positive means are provided for holding said tooth against upward movement.

Each of the arms or brackets 1 is provided with a laterally disposed lug 14 through which is disposed an elongated sleeve 15 terminating beyond opposite sides of the lug 14. Extending freely through the sleeve 15 is an elongated threaded shank 16 having one end portion operatively connected as at 17 with the upper portion of the moldboard 10. Threaded upon the shank 16 and coacting with the opposite ends of the sleeve 15 or more particularly an interposed washer 18 are the lock nuts 19 whereby the shank 16 is maintained in desired adjustment with respect to the sleeve 15. Arranged at opposite sides of the lug 14 and interposed therebetween and the washers 19 are the compression springs 20 herein disclosed as encircling the shank 16. These springs 20 serve to normally maintain the rake in desired position yet permit yieldable swinging movement thereof especially when the teeth 8 come into contact with the undue resistance such as an extra large rock or the like.

In practice, my improved rake is adapted to be drawn over scarified or plowed ground with the teeth 8 penetrating said ground to a desired extent. As the teeth come into contact with oversize rock or the like, the same will be lifted to the surface and brought into contact with the moldboard 10 and be drawn or pushed toward the rear end of said moldboard as the machine advances. The flanges or lugs 11 are arranged on such an angle or inclination as to facilitate the movement of the oversize rock onto the moldboard 10 thereby obviating the catching of rock or gravel at the lower marginal portion of the moldboard 10.

The extent of penetration of the teeth 8 is under control of the lifting mechanism comprised in the grader or scarifier proper but when it is desired that the teeth 8 shall work only upon the surface of the ground, each of the shanks 16 is adjusted forwardly whereby the teeth 8 and the moldboard 10 will be moved rearwardly as indicated by broken lines in Figure 3.

I employ each of the sleeves 15 in connection with each of the shanks 16 to protect from the springs 20 the threads of said shank and also to protect the edges of the lug 14 defining the opening through which the sleeve 15 is disposed.

The inclination of the applied rake is such that when the device is employed in connection with a scarified road the oversize rock will be deposited along the banks of the grade where such oversize rock will serve to prevent erosion of the banks. When the rake is employed for removing oversize stones or the like from a plowed field, the rake will draw such oversize stones into windrows where they can be readily forked or shoveled into wagons.

When it is desired to leave a larger size of rock or gravel below the surface than that near the surface, the teeth 8 may be made thinner toward their points thus making a larger space between adjacent teeth and allowing larger size of rock or gravel to pass between the lower portions of the teeth than can pass between the upper portions of the teeth.

From the foregoing description it is thought to be obvious that a stone rake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A rake of the class described comprising a beam, teeth operatively supported by said beam and extending therebelow, each of said teeth being rhomboidal in cross section.

2. A rake of the class described comprising a beam, teeth operatively supported by the beam and depending therefrom, and a moldboard extending along the beam and above the teeth, said moldboard being provided with inwardly disposed flanges extending between adjacent teeth.

3. In combination with a portable body, a beam disposed therebeneath, means for pivotally connecting the beam with the portable body, teeth operatively engaged with the beam and depending therefrom, a moldboard operatively engaged with the beam above the teeth, and a yieldable connection between the moldboard and body, said beam being disposed at an angle with the line of draft of the body, the side faces of the teeth being in line with the line of draft of the body.

4. In combination with a portable body, a beam disposed therebeneath, means for pivotally connecting the beam with the portable body, teeth operatively engaged with the beam and depending therefrom, a moldboard operatively engaged with the beam above the teeth, and a yieldable connection between the moldboard and body, said beam being disposed at an angle with the line of draft of the body, the side faces of the teeth being in line with the line of draft of the body, said teeth being angularly disposed with respect to the axis of the beam.

5. In combination with a portable body, a beam disposed therebeneath, means for pivotally connecting the beam with the portable body, teeth operatively engaged with the beam and depending therefrom, a moldboard operatively engaged with the beam above the teeth, and a yieldable connection between the moldboard and body, said beam being disposed at an angle with the line of draft of the body, the side faces of the teeth being in line with the line of draft of the body, said teeth being downwardly and forwardly curved.

6. In combination with a portable body, a beam carried thereby, teeth operatively supported by the beam and extending therebelow, each of said teeth being rhomboidal in cross section, the side faces of the teeth being in line with the line of draft of the body.

In testimony whereof I hereunto affix my signature.

WILLIAM M. McLEOD.